United States Patent Office 3,062,617
Patented Nov. 6, 1962

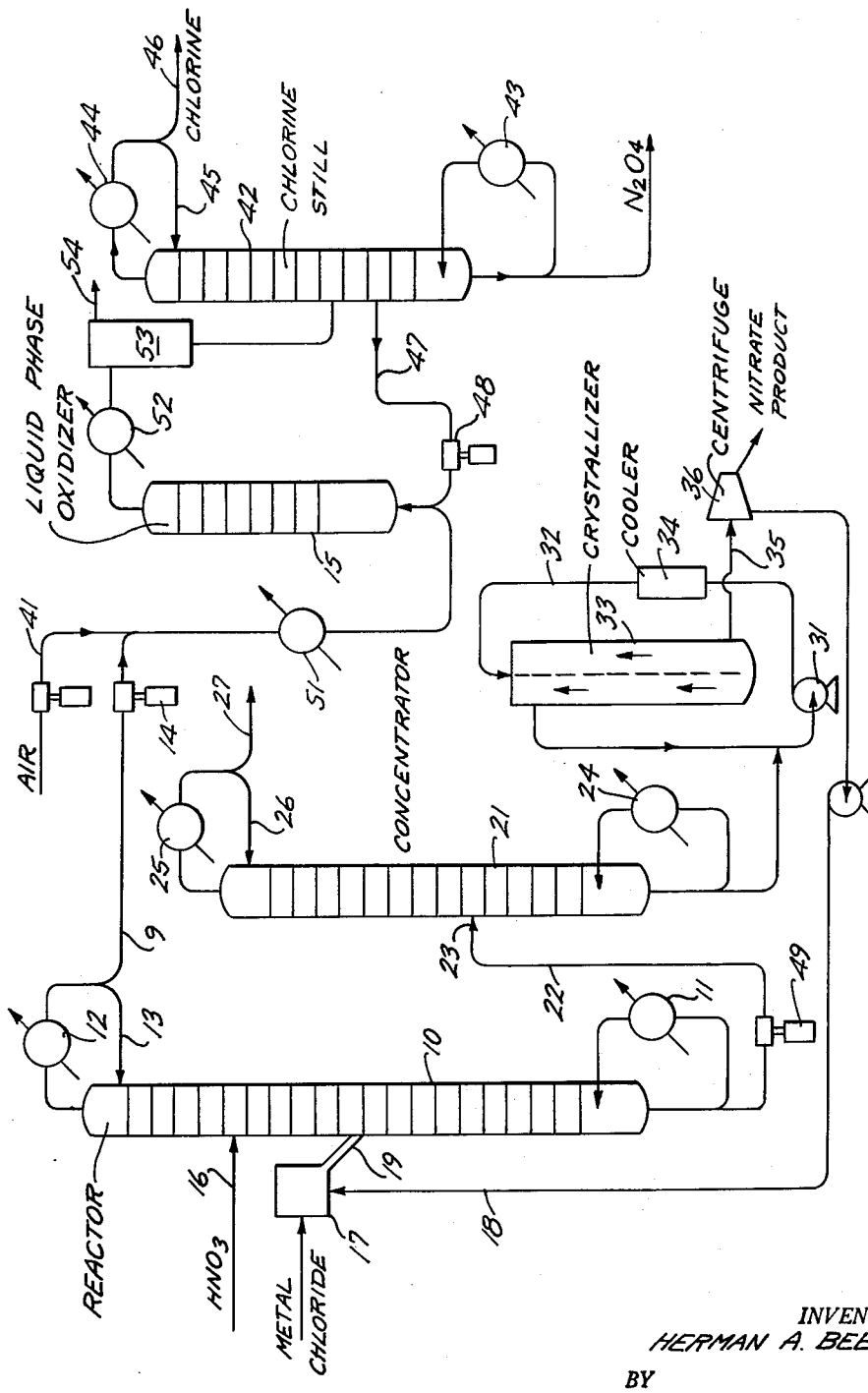

3,062,617
CONVERSION OF METAL CHLORIDES TO THE CORRESPONDING METAL NITRATES
Herman A. Beekhuis, Mount Alverno Road, Media, Pa.
Filed Jan. 14, 1960, Ser. No. 2,540
5 Claims. (Cl. 23—102)

This invention relates to the conversion of alkali and alkaline earth metal chlorides (particularly potassium chloride) to the corresponding alkali and alkaline earth metal nitrates.

Potassium nitrate, as is well known, is useful as a fertilizer, a constituent of mixed fertilizers, and as a raw material in many processes. This invention will hereinafter be described in connection with the conversion of potassium chloride to potassium nitrate, but it will be understood it is not limited thereto and includes the conversion of other alkali metal chlorides, such as sodium, and alkaline earth metal chlorides, such as calcium, to the corresponding nitrates.

The reaction of potassium chloride with nitric acid to produce potassium nitrate, nitrosyl chloride, and chlorine is known. As a practical matter, complete conversion of the potassium chloride and nitric acid to potassium nitrate can not be obtained in the potassium chloride reactor. It is therefore necessary to recycle or otherwise recover unconverted chloride and nitric acid to obtain economically attractive yields.

The presence of water, which of necessity is introduced into the process as part of the nitric acid (aqueous nitric acid is commonly used) and is formed in the reaction, and chloride, aggravate the corrosion problems involved in the handling of the liquors present in the process.

It is among the objects of the present invention to provide a process for converting potassium chloride to potassium nitrate in which the liquors produced are of such character as to minimize corrosion problems in the design of the equipment, particularly in the equipment where the potassium nitrate is crystallized and the crystals are separated from the mother liquor. It is still another object of this invention to provide such process resulting in economically attractive high yields of potassium nitrate and chlorine.

Other objects and advantages of this invention will be apparent from the following detailed description thereof, taken in connection with the accompanying drawing in which the single figure is a diagrammatic layout of the equipment for practicing a preferred embodiment of the invention.

The process of the present invention involves four stages or steps, which will be numbered sequentially for purposes of facilitating description of the invention. It will be appreciated the process is continuous, these stages take place concurrently and the numbers do not indicate any sequence in point of time. In the first stage, potassium chloride is reacted with aqueous nitric acid having a strength of from 50 to 70 weight percent nitric acid while recycling through the reactor mother liquor having on a salt-free basis a concentration of at least 50%, preferably from 50 to 65 percent by weight of nitric acid so as to maintain in the potassium chloride reactor the necessary strength for high conversion of potassium chloride to potassium nitrate and to effect the removal of substantially all of the chloride as nitrosyl chloride and chlorine overhead from the reactor. The reaction is carried out to produce a bottoms product containing at least 45%, preferably at least 50%, by weight of nitric acid on a salt-free basis.

In the second stage, the bottoms from the potassium chloride reactor, which bottoms consist essentially of nitric acid, potassium nitrate, water, small amounts of hydrogen chloride and sodium nitrate (sodium is usually present as an impurity in potassium chloride) is subjected to distillation to drive off overhead a portion, preferably most, of the water, the chloride present as hydrogen chloride and a small amount of the nitric acid, thus concentrating the bottoms with respect to its nitric acid content. By observing the conditions of acid concentration, molar proportions, recycle of mother liquor having nitric acid of the strength indicated, and production of a bottoms product having at least 45%, preferably at least 50%, of nitric acid, on a salt-free basis, in the first stage hereinabove pointed out, the amount of hydrogen chloride in the bottoms is so small that it can be conveniently removed overhead in the second stage.

In the third stage, the concentrated reaction mixture from the second stage, which mixture as noted contains essentially no chloride, is passed to a crystallizer where the potassium nitrate is crystallized out and removed as the desired product. The mother liquor from this crystallization, containing on a salt-free basis from 50% to 65% nitric acid, smaller amounts of potassium nitrate and sodium nitrate, is recycled to the potassium chloride reactor. Essentially no chloride is introduced in the crystallizer and hence corrosion difficulties in the crystallizer, centrifuge or filter for effecting separation of the potassium nitrate crystals from the mother liquor and associated equipment are minimized.

The fourth step involves treatment of the overhead from the first stage which overhead consists of a mixture of NOCl, $Cl_2$ and $NO_2$ to oxidize the nitrosyl chloride to chlorine and nitrogen dioxide ($N_2O_4 \rightleftarrows 2NO_2$). Preferably, the nitrosyl chloride is oxidized in the liquid phase with co-current flow of air or oxygen and the liquid nitrosyl chloride through a column containing at least five contact stages maintained under a pressure of 200 to 750 p.s.i.g. In the first contact stage, the temperature is maintained within the range of from 60° to 80° C., and in the final contact stage, the temperature is maintained within the range of from 75° to 120° C. Using high purity oxygen in amount equal to or less than that required to oxidize all of the nitrosyl chloride, little effluent is produced that is not condensable; chiefly for this reason, it is preferred to use oxygen in the nitrosyl chloride oxidizer.

Chlorine produced in the oxidizer plus that produced in the potassium chloride reactor or first stage are a valuable product of the process. The nitrogen dioxide may be converted to nitric acid by reaction with water and oxygen, as is well known and the nitric acid thus produced employed in the first stage.

In a preferred embodiment of the invention, the first stage or step is carried out in a distillation column reactor in which the reaction mixture is maintained at its boiling point in the base of the column, the temperature within the column is maintained at a descending temperature gradient from bottom to top, reaching a temperature within the range of 0° to —5° C. at or near the top of the column. A vapor mixture of nitrosyl chloride, chlorine and nitrogen dioxide is taken off overhead, condensed, a portion of the condensate returned as reflux and the remainder fed to the oxidizer where the nitrosyl chloride is oxidized to nitrogen dioxide and chlorine. The ratio of reflux to the net liquid product removed from the column is from 0.1 to 0.3. The fresh nitric acid and potassium chloride are fed to the column in a molar ratio in the range of 1.4 to 1.47.

In the drawing, 10 is a combination reaction and distillation column provided with distillation trays and a boiler 11 at its base. A condenser 12 is arranged to receive the vapor stream coming off from the top of distillation column 10. The condensate from condenser 12 is divided into two streams, one of which is returned as reflux through line 13 and the other passed through a pump 14 which communicates with the liquid phase oxidizer 15. From 10% to 30% of the amount of liquid pumped to oxidizer 15 is returned as reflux through line 13; fresh nitric acid is supplied to the reactor 10 through line 16. From two to four theoretical trays are positioned between the fresh nitric acid feed line 16 and the top of the reactor column 10. The potassium chloride feed is supplied to a slurry mixer 17 into which the recycle acid is supplied through line 18. The resultant slurry enters the reactor 10 through line 19.

Reactor 10 is provided with at least 5 theoretical trays below the slurry feed point; while more than 5 theoretical plates can be used, desirably from 5 to 10, for reasons of economy in construction and operation the number above 5 is kept to a minimum consistent with reduction of the chloride content of the bottoms to a practical minimum.

In the base of reactor 10 the mixture is maintained at its boiling point which, when the column is operated under atmospheric pressure conditions, is approximately 115° C. The top of this column is at a temperature of 0° to —5° C. The fresh nitric acid is introduced through line 16 at a point in the column where the temperature is 0° to 10° C.

An important feature of the present invention is that the fresh nitric acid is introduced at a point in the column below the tray where the temperature is not higher than 10° C., preferably not higher than 0° C. This feature, in combination with the utilization of a reflux ratio of from 0.1 to 0.3, results in substantially complete drying of the gases going off overhead from the reactor column; substantially all of the water introduced into the column is removed therefrom as a constituent of the bottoms.

The recycle acid concentrator 21 is in the form of a distillation column which communicates through line 22 and pump 49 with the base of the potassium chloride reactor 10 so that the bottoms from this reactor flow continuously through line 22 leading into column 21 at point 23. A boiler 24 communicates with the base of this column for maintaining the reaction products at the boiling point, i.e. about 120° C.

The top of this column communicates with a condenser 25 for condensing the vapor leaving the column. The condensate is divided into two streams, one of which is returned as reflux through line 26 and the other is removed through line 27. Alternately, all the vapors from concentrator 21 may be vented with or without prior condensation, using either plain water or wash water from centrifuge 36 as reflux.

Pump 31 pumps the solution or slurry from concentrator 21 through the circulating system 32 of the crystallizer 33; circulating system 32 comprises a cooler 34 through which the supernatant liquid from the crystallizer flows. The cooled liquid is mixed with the solution or slurry and the mixture is pumped into the crystallizer 33. Crystals are withdrawn from the base of the crystallizer 33 through the line 35 and enter the centrifuge 36 which effects the separation of the potassium nitrate crystals from the mother liquor. The mother liquor flows through the line 18 into the slurry mixer 17. Instead of the heat exchange type crystallizer shown, vacuum type crystallizers as well as other known types of crystallizers can be used.

The overhead from the reactor 10 mixes with air or oxygen supplied through line 41. When using air, as shown in FIGURE 1, the mixture of air and the overhead flowing through line 9 passes through preheater 51 into the oxidizer 15. The effluent from oxidizer 15 is cooled in refrigerator 52 and the refrigerated mixture introduced into the separator 53 from which the non-condensible gases are vented through vent 54. The condensate passes from the separator 53 to the chlorine still 42 provided at its base with a boiler 43. In chlorine still 42 the condensate is fractionated, the chlorine going off overhead and condensed in condenser 44. A portion of the chlorine is returned to chlorine still 42 through line 45 as reflux liquid and the remainder removed as product through line 46. A recycle or side stream containing nitrosyl chloride is removed through line 47 and is pumped by pump 48 into the base of the oxidizer 15.

Nitrogen dioxide is removed as bottoms from the chlorine still 42 and can be reacted with water and oxygen to produce nitric acid to supply the fresh nitric acid for the process.

In the example shown, the nitrogen and unused oxygen feed to the oxidizer is vented through line 54 along with some chlorine, which is volatile at these conditions. The chlorine can be separated from these inert gases by conventional means if desired. Oxygen can be fed in place of air to the oxidizer which will greatly reduce the size of the equipment and simplify the recovery of the chlorine that passes out with the inert gases vented from line 54.

The following example is given for purposes of illustrating the invention. It will be understood the invention is not limited to this example. In this example all pound values are pounds per hour, percentages are on a weight basis, and temperatures are in degrees centigrade.

*Example*

This example is carried out in equipment of the type shown in the drawing.

*Step 1.*—131.8 pounds of nitric acid of 67% concentration containing 88.3 pounds (1.4 mols) of nitric acid and 43.5 pounds of water is introduced into the potassium chloride reactor at a point where the temperature is about 0° C. Introduced into this reactor at approximately its midpoint, which is below the point of introduction of the nitric acid, is a slurry of potassium chloride produced by mixing 74.6 pounds (1 mol) of potassium chloride with the recycle acid stream in amount of 418.83 pounds consisting of 167.1 pounds nitric acid, 111.4 pounds water, 111.0 pounds potassium nitrate, 29.3 pounds sodium nitrate and 0.03 pound hydrogen chloride. This recycle acid stream contained 60% nitric acid on a salt-free basis. The temperature at the base of the reactor is 115° C. and at the top —5° C. The vapors taken off overhead are cooled to a temperature of —25° C. The condensate thus produced is divided into two streams. One stream in amount of 14.6 pounds consisting of 7.4 pounds chlorine, 5.8 pounds nitrosyl chloride, and 1.4 pounds nitrogen dioxide is returned as reflux. The other or second stream in amount of 48.7 pounds consisting of 24.6 pounds chlorine, 19.5 pounds nitrosyl chloride, and 4.6 pounds nitrogen dioxide is passed to the oxidizer, as hereinafter described.

576.56 pounds of reactor bottoms is removed containing 50% nirtic acid on a salt-free basis. The reactor bottoms contain 167.4 pounds nitric acid, 167.4 pounds water, 0.36 pound hydrochloric acid, 212.1 pounds potassium nitrate, and 29.3 pounds sodium nitrate.

*Step 2.*—The reactor bottoms are introduced into the recycle acid concentrator operated at a temperature of 120° C. at its base and 100° C. at its top. The vapors taken overhead are partially condensed and the condensate is returned as reflux in amount of 32.2 pounds water. The uncondensed vapor in amount of 56.6 pounds consisting of 56.0 pounds water, 0.33 pound hydrochloric acid, and 0.3 pound nitric acid is passed to waste. Bottoms from the acid concentrator are removed in amount of 519.9 pounds consisting of 167.1 pounds nitric acid, 111.4 pounds water, 212.1 pounds potassium nitrate, and 29.3 pounds sodium nitrate. It contains 60 weight percent nitric acid on a salt-free basis.

*Step 3.*—The bottoms from the acid concentrator are cooled to 40° C. and introduced into the crystallizer. A slurry of crystals are withdrawn from the crystallizer and passed through a centrifuge. 101.1 pounds of potassium nitrate (1 mol) are removed from the centrifuge. The mother liquor in amount of 418.83 pounds consisting of 167.1 pounds nitric acid, 111.4 pounds water, 111.0 pounds potassium nitrate, 29.3 pounds sodium nitrate and 0.03 pound hydrogen chloride is recycled to the potassium chloride reactor. It contains 60 weight percent nitric acid on a salt-free basis.

*Step 4.*—The aforementioned second stream in amount of 48.7 pounds from the condenser communicating with the potassium chloride reactor is fed to the oxidizer where it is mixed with 29.3 pounds of air and the mixture introduced into the oxidizer at a temperature of 60° C. The oxidizer is maintained under a pressure of 450 p.s.i.g. and at a temperature of 70° C. at its base and 80° C. at its top. Admixed with this oxidizer feed is the recycle from the chlorine still in amount of 15.9 pounds, containing 4.5 pounds chlorine, 8.4 pounds nitrosyl chloride and 3.0 pounds nitrogen dioxide. The oxidizer feed in amount of 64.6 pounds thus contains 29.1 pounds chlorine, 27.9 pounds nitrosyl chloride and 7.6 pounds nitrogen dioxide. There is removed from the oxidizer 94.0 pounds of product consisting of 39.7 pounds chlorine, 8.4 pounds nitrosyl chloride, 21.4 pounds nitrogen dioxide, 2.0 pounds oxygen and 22.5 pounds nitrogen. The chlorine, nitrosyl chloride and nitrogen dioxide are condensed and thus separated from the oxygen and nitrogen. This condensate is then fed to the chlorine still where it is fractionated. 35.2 pounds of chlorine are taken off overhead, and 18.4 pounds of nitrogen dioxide removed as bottoms. Also removed from this chlorine still is the above described recycle stream containing 4.5 pounds of chlorine, 8.4 pounds nitrosyl chloride and 3.0 pounds nitrogen dioxide.

In this example, of the nitrogen in the nitric acid feed, 71.2% is recovered as potassium nitrate and 28.5% as nitrogen dioxide. The yield of chlorine based on the potassium chloride feed is 99.6%.

An important feature of this invention is that the concentration of the nitric acid in the potassium chloride reactor bottoms is at least 45% nitric acid on a salt-free basis, preferably from 50% to 55%. A concentration of nitric acid within this range in the reactor bottoms is readily obtained by effecting the concentration of the reactor bottoms as hereinabove disclosed and passing the nitric acid recycle stream having the nitric acid concentration hereinabove disclosed through the potassium chloride reactor. By operating under these conditions and by designing the potassium chloride reactor with the necessary number of theoretical plates, at least five below the slurry feed point, the chloride concentration in the reactor bottoms is so low that it is feasible to dispose of what little chloride there is therein as overhead from the acid concentrator. Substantially all of the chloride is converted to nitrosyl chloride and chlorine in the potassium chloride reactor; the nitrosyl chloride and chlorine are taken off overhead from the potassium chloride reactor, and the nitrosyl chloride oxidized to nitrogen dioxide and chlorine. The chlorine thus obtained and that formed in the reactor is recovered and is a valuable product of the process. Chloride or chlorine does not reach the crystallizer in appreciable amounts and hence corrosion problems in the crystallizer, associated centrifugal separator equipment or other equipment employed in the separation of the potassium nitrate from the mother liquor, are minimized.

It will be noted the present invention provides a process of converting potassium chloride nad other alkali metal and alkaline earth metal chlorides to the corresponding nitrate, which process results in high yields of the nitrate in that substantially all of the alkali metal and alkaline earth metal is utilized in the process. Moreover the liquors produced in the process are of such character as to minimize corrosion problems entailed in their handling.

Since certain changes may be made in carrying out the above described method of converting alkali metal and alkaline earth metal chlorides to the corresponding nitrates without departing from the scope of this invention, it is intended that all matter contained in the above description or shown in the accompanying drawing shall be interpreted as illustrative and not in a limiting sense. Thus while the invention has been described in connection with operations in the potassium chloride reactor and acid concentrator under atmospheric pressure conditions (pressure of about 1 atmosphere at the top of each column), these columns may be operated under pressures of two or three atmospheres or even higher super-atmospheric pressures. The temperatures will, of course, be changed correspondingly; the mixtures in the bottoms of these columns are maintained boiling under the pressure conditions existing therein.

What is claimed is:

1. The process of converting a metal chloride from the group consisting of alkali metal and alkaline earth metal chlorides to the corresponding metal nitrate which comprises: step 1, feeding to a distillation column aqueous nitric acid having a concentration of nitric acid of from 50% to 70% by weight and said metal chloride, passing the metal chloride and nitric acid downwardly through said column counter-current to a rising stream of vapors produced by heating the reaction mixture to its boiling point near the base of said column while maintaining the temperature within said column at a descending temperature gradient from bottom to top reaching a temperature not exceeding 0° C. at the top of said column, condensing the vapor stream leaving said column and returning as reflux a portion of the condensate, recycling through said column mother liquor derived from step 3, said mother liquor containing from 50% to 65% by weight nitric acid on a salt-free basis, and removing as bottoms from said column the reaction mixture; step 2, introducing the reaction mixture from step 1 into a second distillation column and subjecting it to distillation therein, taking off overhead water vapor and substantially the entire chloride content of the reaction mixture and removing as bottoms concentrated reaction mixture substantially free of chloride; step 3, crystallizing the metal nitrate from the reaction mixture from step 2, separating the metal nitrate crystals from the mother liquor and recycling the mother liquor to and through step 1; and step 4, oxidizing the overhead from step 1 to convert the nitrosyl chloride to nitrogen dioxide and chlorine and separating the chlorine from the nitrogen dioxide.

2. The process of converting a metal chloride from the group consisting of alkali metal and alkaline earth metal chlorides to the corresponding metal nitrate which comprises: step 1, feeding to a distillation column aqueous nitric acid having a concentration of from 50% to 70% by weight and said metal chloride in the proportions of from 1.4 to 1.47 mols of nitric acid per mol of metal chloride, introducing said nitric acid into said column at a point where the temperature is from 0° to 10° C., passing the metal chloride and nitric acid downwardly through said column counter-current to a rising stream of vapors produced by heating the reaction mixture to its boiling point near the base of said column, maintaining the temperature within said column at a descending temperature gradient from bottom to top reaching a temperature not exceeding 0° C. at the top of said column, condensing the vapor stream containing nitrosyl chloride, chlorine and nitrogen dioxide leaving said column and returning as reflux a portion of the condensate equal to from 10% to 30% by weight of the amount of said condensate withdrawn from said column, recycling through said column mother liquor derived from step 3 containing from 50% to 65% by weight of nitric acid on a salt-free basis, and removing as bottoms from said column the reaction mixture; step 2, introducing the reaction mixture from step 1 into a second distillation column and subjecting it to distillation therein, taking off overhead water vapor and the entire chloride content of the reaction mixture and removing as bottoms concentrated reaction mixture free of chloride; step 3, crystallizing the metal nitrate from said concentrated reaction mixture from step 2, separating the metal nitrate crystals from the mother liquor and recycling the mother liquor to and through step 1; and step 4, oxidizing the overhead from step 1 to convert the nitrosyl chloride to nitrogen dioxide and chlorine, and separating the chlorine from the nitrogen dioxide.

3. The process of converting potassium chloride to potassium nitrate which comprises: step 1, feeding to a distillation column aqueous nitric acid of 50% to 70% concentration by weight and potassium chloride in the proportions of from about 1.4 to 1.47 mols of nitric acid per mol of potassium chloride, passing the potassium chloride and nitric acid downwardly through said column counter-current to a rising stream of vapors produced by heating the reaction mixture to its boiling point near the base of said column, condensing the vapors containing nitrosyl chloride and chlorine leaving the top of said column and returning as reflux to the top of said column a portion of the condensate, maintaining the top of said column at a temperature of 0° to —5° C., recycling through said column mother liquor derived from step 3 containing on a salt-free basis of from 50% to 65% by weight of nitric acid; step 2, concentrating the reaction mixture from step 1 in a distillation column to drive off overhead water and all of the chloride in said reaction mixture and remove as bottoms concentrated reaction mixture; step 3, crystallizing potassium nitrate from said concentrated reaction mixture, separating the potassium nitrate crystals from the mother liquor and recycling the mother liquid through step 1; and step 4, oxidizing the nitrosyl chloride in the overhead stream from step 1 to convert it to nitrogen dioxide and chlorine, separating the nitrogen dioxide from the chlorine, reacting the nitrogen dioxide thus separated with water and oxygen to produce nitric acid, and using the nitric acid thus produced in step 1.

4. The process of converting potassium chloride to potassium nitrate which comprises: step 1, feeding to a distillation column aqueous nitric acid of about 67% concentration by weight and potassium chloride in the proportions of from about 1.4 to 1.47 mols of nitric acid per mol of potassium chloride, passing the potassium chloride and nitric acid downwardly through said column counter-current to a rising stream of vapors produced by heating the reaction mixture to its boiling point near the base of said column, condensing the vapors containing nitrosyl chloride, chlorine and nitrogen dioxide leaving the top of said column, returning as reflux to the top of said column a portion of the condensate equal to from 10% to 30% by weight of the amount of said condensate withdrawn from said column, maintaining the top of said column at a temperature of about —5° C., recycling through said column mother liquor derived from step 3 containing about 60% nitric acid on a salt-free basis; step 2, concentrating the reaction mixture from step 1 in a distillation column to drive off overhead water and all of the chloride in said reaction mixture and remove as bottoms concentrated reaction mixture; step 3, cooling said concentrated reaction mixture from step 2, crystallizing potassium nitrate therefrom, separating the potassium nitrate crystals from the mother liquor and recycling the mother liquor containing 60% by weight of nitric acid, on a salt-free basis, through step 1; and step 4, oxidizing the nitrosyl chloride in the overhead stream from step 1 to nitrogen dioxide and chlorine, separating the nitrogen dioxide from the chlorine and reacting the nitrogen dioxide thus separated with water and oxygen to produce nitric acid.

5. The process of converting potassium chloride to potassium nitrate which comprises: step 1, feeding to a distillation column aqueous nitric acid of 67% concentration by weight and potassium chloride in the proportions of from about 1.4 to 1.47 mols of nitric acid per mol of potassium chloride, introducing said nitric acid into said column at a point where the temperature is not higher than 10° C., passing the potassium chloride and nitric acid downwardly through said column counter-current to a rising stream of vapors produced by heating the reaction mixture to its boiling point near the base of said column, condensing the vapors containing nitrosyl chloride, chlorine and nitrogen dioxide leaving the top of said column, returning as reflux to the top of said column a portion of the condensate equal to from 10% to 30% by weight of the amount of said condensate withdrawn from said column, maintaining the top of said column at a temperature of —5° C., recycling through said column mother liquor derived from step 3 containing 65% nitric acid on a salt-free basis; step 2, concentrating the reaction mixture from step 1 in a distillation column to drive off overhead water and all of the chloride in said reaction mixture and remove as bottoms concentrated reaction mixture containing 65% by weight of nitric acid on a salt-free basis; step 3, cooling said concentrated reaction mixture from step 2, crystallizing potassium nitrate therefrom, separating the potassium nitrate crystals from the mother liquor and recycling the mother liquor containing 65% by weight of nitric acid on a salt-free basis through step 1; and step 4, oxidizing the nitrosyl chloride in the overhead stream from step 1 to nitrogen dioxide and chlorine, separating the nitrogen dioxide from the chlorine and reacting the nitrogen dioxide with water and oxygen to produce nitric acid.

References Cited in the file of this patent

UNITED STATES PATENTS

| | | |
|---|---|---|
| 2,092,383 | Tramm et al. | Sept. 7, 1937 |
| 2,181,559 | Beekhuis | Nov. 28, 1939 |
| 2,215,450 | Beekhuis | Sept. 24, 1940 |